United States Patent
Belser et al.

(10) Patent No.: US 8,989,380 B1
(45) Date of Patent: Mar. 24, 2015

(54) CONTROLLING COMMUNICATION OF A WIRELESS COMMUNICATION DEVICE

(75) Inventors: John Belser, Olathe, KS (US); Joao Teixeira, Shawnee, KS (US); John Sumler, Kansas City, KS (US); Cesar Perez, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 4 days.

(21) Appl. No.: 13/204,869

(22) Filed: Aug. 8, 2011

(51) Int. Cl.
*H04L 9/32* (2006.01)
*H04L 29/06* (2006.01)

(52) U.S. Cl.
CPC ......... *H04L 63/0823* (2013.01); *H04L 63/0853* (2013.01)
USPC .................................. 380/270; 726/3; 726/17

(58) Field of Classification Search
None
See application file for complete search history.

(56) References Cited

U.S. PATENT DOCUMENTS

| 7,715,867 | B2* | 5/2010 | He et al. ...................... 455/550.1 |
| 8,041,644 | B2* | 10/2011 | Ogg et al. ........................ 705/60 |
| 2004/0204075 | A1* | 10/2004 | Rusnak et al. ................ 455/557 |
| 2005/0257072 | A1* | 11/2005 | Cross et al. ................... 713/193 |
| 2007/0042754 | A1* | 2/2007 | Bajikar et al. ................ 455/411 |
| 2007/0161404 | A1* | 7/2007 | Yasujima et al. ............. 455/557 |
| 2008/0005783 | A1* | 1/2008 | Polzin et al. ..................... 726/3 |

OTHER PUBLICATIONS

Lexmark, Security and USB Ports on Lexmark Devices, Version 2.1, Oct. 2010, pp. 1-8.*

* cited by examiner

*Primary Examiner* — Jung Kim
*Assistant Examiner* — James J Wilcox (57) ABSTRACT

In a system and method of controlling a wireless communication module in communication with an electronic device, when a manufacturer certificate, a wireless device credential, and a user credential each meet a respective first, second and third validity criteria, an encryption value is generated, and the encryption value is used to generate a cryptographic hash value. The cryptographic hash value is used to enable a device to communicate with a communication network.

8 Claims, 9 Drawing Sheets

CONTROLLING COMMUNICATION OF A WIRELESS COMMUNICATION DEVICE

TECHNICAL BACKGROUND

A wireless device may connect to a communication network over a wireless communication link to send and receive data through the communication network. Such data communication can take the form of data packets, and the data communication can convey voice, media, or other information.

Communication between a device and a communication network, and particularly between a wireless device and a communication network, raises issues of network and data security, including authorizing access to the communication network and authorizing the use of communication functions of the wireless device. Prior to establishing a network connection, a wireless device typically is authenticated by the communication network to determine that the wireless device is authorized to access the network. For example, a wireless device may transmit an access request with authentication credentials to a communication network, and the network may use the credentials to determine if the wireless device is authorized, and thereafter an authorized device can be granted access to the network. Such authentication processes are usually transparent to a wireless device user.

In some situations, a wireless device may not be authenticated and authorized to access the network. For example, a wireless device may lack a valid credential because a user account has been suspended or inactivated, or the data of a device credential may have become corrupted. In such cases, the wireless device may not be authorized to access the network, or network access may be restricted, for example, to some limited set of access or functions. Wireless devices are typically configured to repeatedly transmit an access request if the wireless device is denied authorization to access the network. Repeated attempts to access the network consume system resources including radio and backhaul bandwidth and processor load at network nodes.

Overview

Systems and methods of controlling a wireless communication module in communication with an electronic device are provided. A manufacturer certificate is obtained from an electronic device memory, and it is determined whether the manufacturer device meets a first validity criteria. A wireless device credential is obtained from a wireless communication module, and it is determined whether the wireless device credential meets a second validity criteria. A user credential is obtained from a user input of the electronic device, and it is determined whether the user credential meets a third validity criteria. An encryption value is generated using the using the manufacturer certificate, the wireless device credential and the user credential when the manufacturer certificate, the wireless device credential and the user credential meet the first, second and third validity criteria, respectively. The encryption value is hashed to generate a cryptographic hash value, and wireless communication of the electronic device is enabled using the cryptographic hash value.

DETAILED DESCRIPTION

Prior to establishing a network connection, a wireless device typically is authenticated by the communication network to determine that the wireless device is authorized to access the network. For example, a wireless device may transmit an access request with authentication credentials to a communication network, and the network may use the credentials to determine if the wireless device is authorized, and thereafter an authorized device can be granted access to the network. Such authentication processes are usually transparent to a wireless device user. A wireless device may not be authenticated and authorized to access the network, for example, if the wireless device lacks a valid credential because a user account has been suspended or inactivated, or because the data of a device credential may have become corrupted. In such cases, the wireless device may not be authorized to access the network, or network access may be restricted, for example, to some limited set of access or functions.

Access to a network can be limited or authorized based on a predetermined combination of hardware, software and access credentials, such that only an individual device (or class of devices) is allowed to access wireless communication. The combination of hardware, software and access credentials can constitute a layer of network security in which lack of any one element prohibits or restricts wireless device communication, for example, by disabling or restricting communication port and/or wireless communication functionality.

Figure 1:
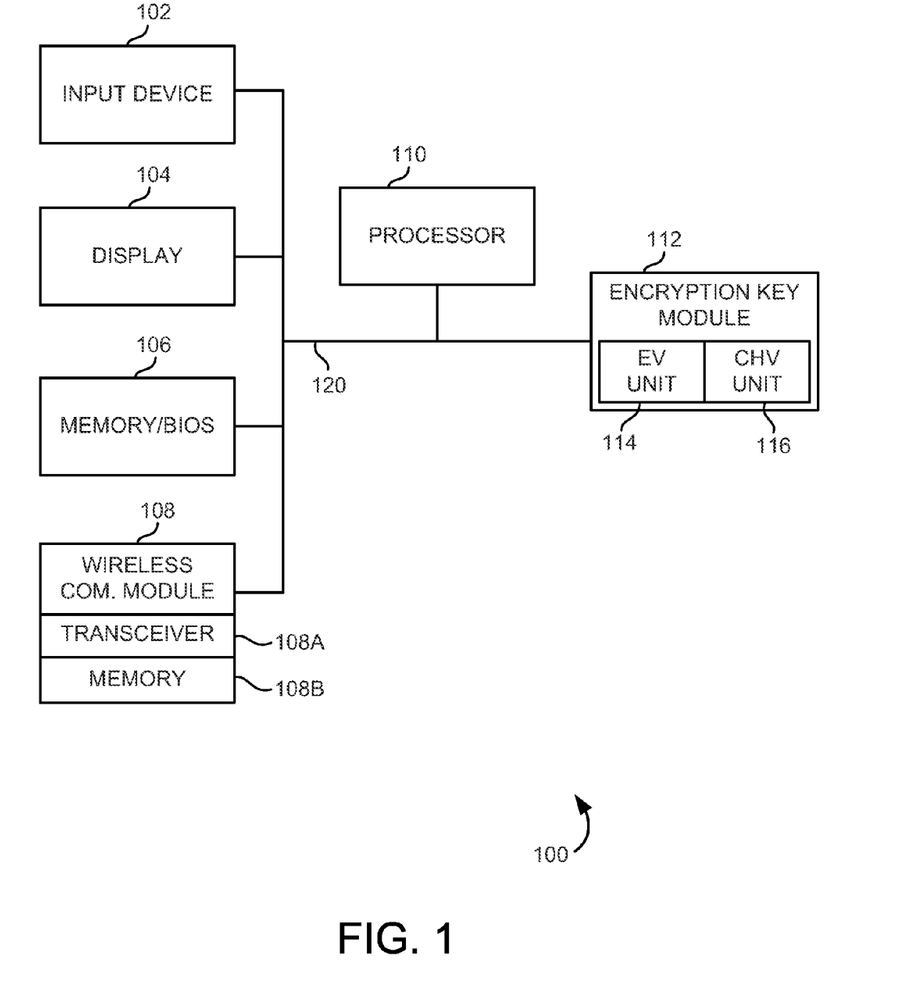
FIG. 1 illustrates an exemplary system for controlling a wireless communication module in communication with an electronic device.

FIG. 1 illustrates an exemplary system 100 for controlling a wireless communication module in communication with an electronic device comprising input device 102, display 104, memory 106, wireless communication module 108, processor 110, and encryption key module 112. Input device 102 can receive an input from a user, and, for example, comprises a keyboard, a touch screen, a touch pad, a mouse, a button, a slider, a switch, or some other input device. Input device 102 can permit a user to input a user credential to the system 100. A user credential comprises for example password, a private key, or some other information known only to the user.

Display 104 can display information. Memory 106 can store data, and for example comprises a disk drive, a flash drive, a solid state memory device, a memory circuitry, or some other memory device, in various forms of volatile and non-volatile memory storage. Memory 106 can store software comprising for example computer programs, firmware, or some other form of machine-readable instructions, and may include an operating system, utilities, drivers, network interfaces, applications, or some other type of software. Memory 106 can include a basic input/output operating system (BIOS) of the system 100. BIOS 106 can store, among other things, a manufacturer certificate of the system 100. A manufacturer certificate comprises, for example, a device identifier, such as a system licensed internal code (SLIC).

Wireless communication module 108 enables the system 100 to communicate wirelessly, and can include transceiver 108A to permit the sending and receiving of signals. Examples of wireless signals comprise radio frequency, microwave, infrared, laser, visible light, and other similar signals. Wireless communication module 108 can also include a memory 108B which can store, among other things, a wireless device credential. A wireless device credential comprises, for example, an electronic serial number (ESN), a machine access control (MAC) address, a mobile equipment identifier (MEID), and extended unique identifier (EUI), and other similar data which can serve as a credential.

Processor 110 can retrieve and execute software from memory/BIOS 106, process data, and control the operation of elements 102-108. Processor 110 can enable the retrieval of the manufacturer certificate from memory/BIOS 106 and the wireless device credential from wireless communication module memory 108B, and can also receive the user credential input to input device 102. Processor 110 can control the determination of whether the manufacturer certificate, the wireless device credential, and the user credential each meet al. separate validity criteria for each credential. Validity of each of the manufacturer certificate, the wireless device credential, and the user credential can be determined, for example, at the encryption key module 112, or in another element of system 100. Elements 102-110 can communicate over communication link 120, which comprises a wired communication link, such as a communication bus, or a wireless communication link, or a combination thereof.

Encryption key module 112 enables the creation of an encryption key which can be used by the system 100 to execute a security function. The security function can be, for example, determining whether to enable system 100 to communicate wirelessly enabling wireless communication module 108, or whether to enable a communication port of system 100. Encryption key module 112 can be a component integral to the system 100, for example an internal chip or a circuit board component, or it can be a removable component, for example a removable flash memory device. Encryption key module 112 can also be embodied in computer-executable code on a computer-readable medium. Other embodiments of encryption key module 112 are also possible. In any case, encryption key module 112 can communicate with elements 102, 104, 106, 108 and 110 through communication link 120.

Encryption key module 112 comprises encryption value (EV) unit 114 and cryptographic hash value (CHV) unit 116. EV unit 114 can receive the manufacturer certificate from memory/BIOS 106, the wireless device credential from wireless communication module 108, and the user credential from input device 102, and can generate an encryption value using the manufacturer certificate, wireless device credential, and user credential. EV 114 unit can provide the encryption value to CHV unit 116. Using the encryption value, the CHV unit 116 can create a cryptographic hash value, which comprises, for example, an encryption key. CHV unit 116 can provide the cryptographic hash value to processor 110, which can execute a security function such as validating the cryptographic hash value. When the cryptographic hash value is validated by processor 110, processor 110 enables the system 100 to communicate wirelessly, for example, by enabling a communication port of system 100, or by enabling wireless communication module 108.

In embodiments, system 100 can be a system with an embedded authentication system, such as a cable set top box, a DVD player, a digital video recorder, an interact access device (such as router or a dedicated interact-TV device), a vending machine, an automobile or other vehicle, or a portable electronic device. In embodiments, encryption key module 112 can be a system contained within a larger device or system, or it can be a device which can communicate with other devices, such as a peripheral device or a "dongle".

In operation, the manufacturer certificate, the wireless device credential, and the user credential are validated and used to generate an encryption value at EV unit 114, and the encryption value is used to generate a cryptographic hash value at CHV unit 116. An example of the cryptographic hash value is a digital signature or fingerprint based on the combined elements of the manufacturer certificate, the wireless device credential, and the user credential, which can be used for authentication of system 100 with a communication network. System 100 typically supports modification of BIOS 106, such as modification of the BIOS advanced parameter table, which can be set during manufacturing or set according to message received during operation, such as an over-the-air message. In the event of an authentication failure, system 100 may power up, however, a communication capability of system 100 may be restricted or disabled. For example, communication port availability may be restricted or disabled, limiting the ability of system 100 to use external communication ports and/or wireless communication capability.

Figure 2:
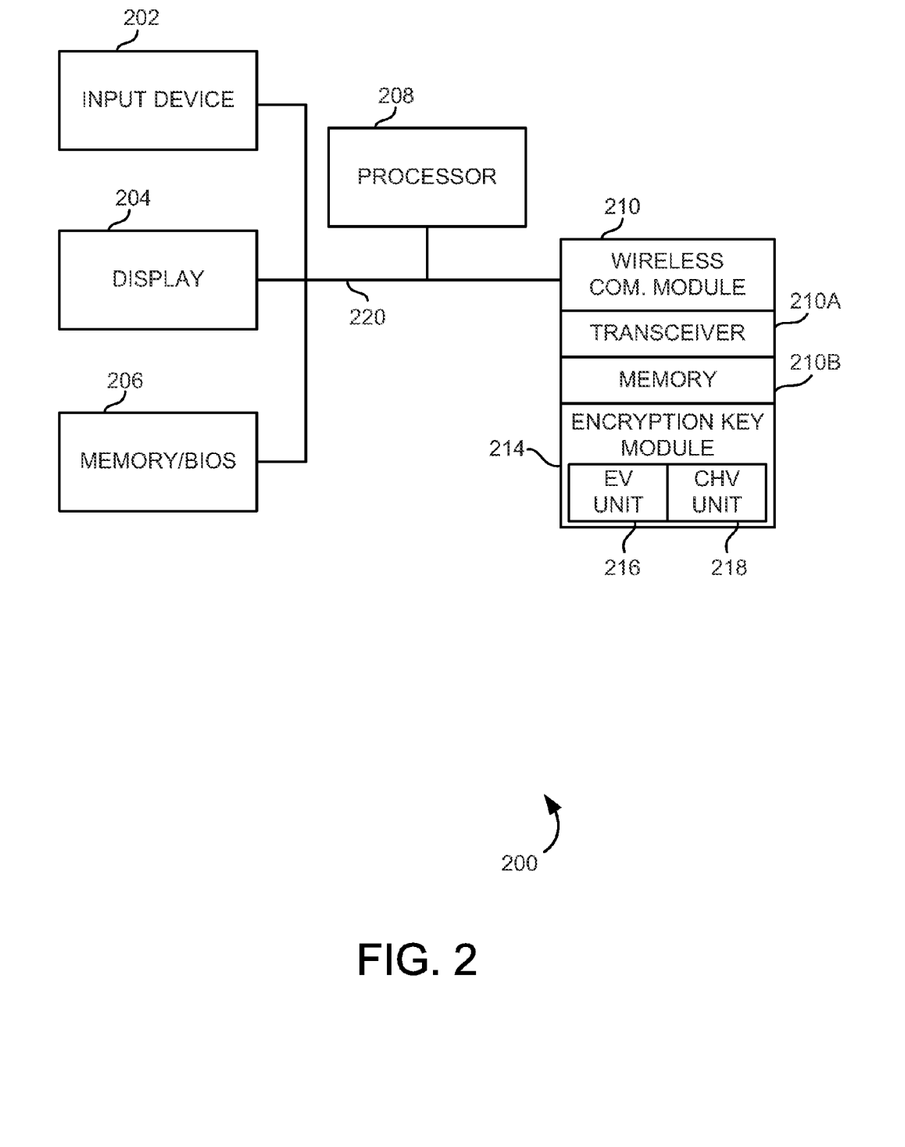
FIG. 2 illustrates another exemplary system for controlling a wireless communication module in communication with an electronic device.

FIG. 2 illustrates another exemplary system 200 for controlling a wireless communication module in communication with an electronic device. System 200 comprises input device 202, display 204, memory 206, processor 208, and wireless communication module 210, each of which can communicate over communication link 220. Input device 102, display 204, memory 206, processor 208, and communication link 220 are analogous to elements described in FIG. 1, and further description thereof is omitted for brevity.

Wireless communication module 210 comprises transceiver 210A, memory 210B, and encryption key module 214. Encryption key module 214 comprises encryption value (EV) unit 216 and cryptographic hash value (CHV) unit 218. Wireless communication module 210 can be a component integral to the system 200, for example an internal wireless card, or it can be a removable component, for example an external wireless communication card such as may be used with a portable computer or other electronic device. In either case, wireless communication module 210 can communicate with elements 202, 204, 206 and 208 through communication link 220.

Wireless communication module 210 enables the system 200 to communicate wirelessly, and can include transceiver 210B to permit the sending and receiving of signals. Wireless communication module 210 can also include a memory 210B which can store, among other things, a wireless device credential.

Encryption key module 214 permits the creation of an encryption key which can be used by the system 200 to execute a security function. The security function can be, for example, determining whether to enable the system 200 to communicate wirelessly by enabling the wireless communication module 210 or a communication port of device 200.

Encryption key module 214 comprises EV unit 216 and CHV unit 218. EV unit 216 can receive a manufacturer certificate from the memory/BIOS 206, a wireless device credential from the wireless communication module 210, and a user credential from the input device 202, and can generate an encryption value using the manufacturer certificate, wireless device credential, and user credential. EV unit 216 can provide the encryption value to CHV unit 218. Using the encryption value, CHV unit 218 can create a cryptographic hash value, which comprises, for example, an encryption key. CHV unit 218 can provide the cryptographic hash value to processor 208, which can execute a security function such as validating the cryptographic hash value. When the cryptographic hash value is validated by processor 208, processor 208 enables the system 200 to communicate wirelessly, for example by enabling a communication port of system 200 or by enabling wireless communication module 210.

Figure 3:
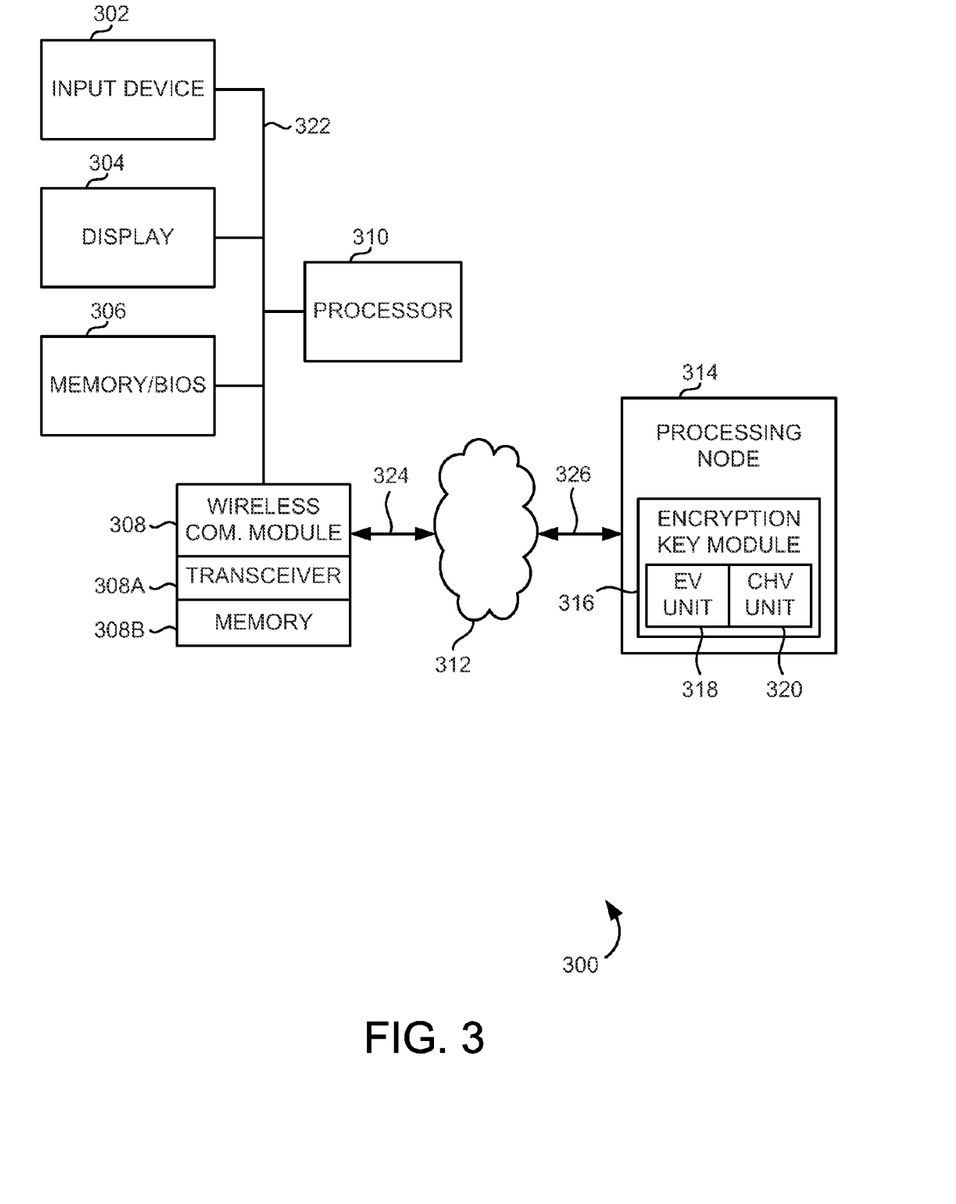
FIG. 3 illustrates another exemplary system for controlling a wireless communication module in communication with an electronic device.

FIG. 3 illustrates another exemplary system for controlling a wireless communication module in communication with an electronic device. System 300 comprises input device 302, display 304, memory 306, wireless communication module 308, processor 310, communication link 322, communication network 312, and processing node 314. Input device 302, display 304, memory 306, processor 310, and communication link 322 are analogous to elements described in FIG. 1, and further description thereof is omitted for brevity.

Wireless communication module 308 can include transceiver 308A to permit the sending and receiving of signals, and memory 308B which can store, among other things, a wireless device credential. Wireless communication module 308 can communicate with communication network 312 over communication link 324. Communication network 312 comprises access nodes and transmissions nodes to permit the transmission of data, and may comprise various network elements (which are omitted for clarity) including access points, routers, network address servers, base stations, base station controllers, gateways, mobile switching centers, dispatch application processors, location registers such as a home location register or visitor location register, other similar network elements, and physical and/or wireless data links for carrying data among the various network elements.

Communication network 312 can also communicate with processing node 314 over communication link 326. Communication links 324 and 326 can be wired or wireless communication links or combinations thereof. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Processing node 314 is a network element capable of receiving, processing, and sending data. Processing node 314 can comprise encryption key module 316. Encryption key module 316 permits the creation of an encryption key which can be used by the system 300 to execute a security function. Encryption key module 316 can be a physical component of the processing node 314, or it can be embodied in computer-executable code on a computer-readable medium of processing node 314.

Encryption key module 316 comprises encryption value (EV) unit 318 and cryptographic hash value (CHV) unit 320. EV unit 318 can receive a manufacturer certificate from the memory/BIOS 306, a wireless device credential from the wireless communication module 308, and a user credential from the input device 302, and can generate an encryption value using the manufacturer certificate, the wireless device credential, and the user credential. EV unit 318 can provide the encryption value to CHV unit 320. Using the encryption value, CHV unit 320 can create a cryptographic hash value, which comprises, for example, an encryption key. CHV unit 320 can provide the cryptographic hash value to processor 310, which can execute a security function such as validating the cryptographic hash value. When the cryptographic hash value is validated by processor 310, processor 310 enables system 300 to communicate with a communication network, for example, by fully enabling wireless communication module 308 or a communication port of system 300 to communicate with a communication network. That is, communication between wireless communication module 308 and processing node 314 can be enabled for the limited purpose of authentication, and thereafter if a device is authenticated, further communication by the device can be enabled.

Figure 4:
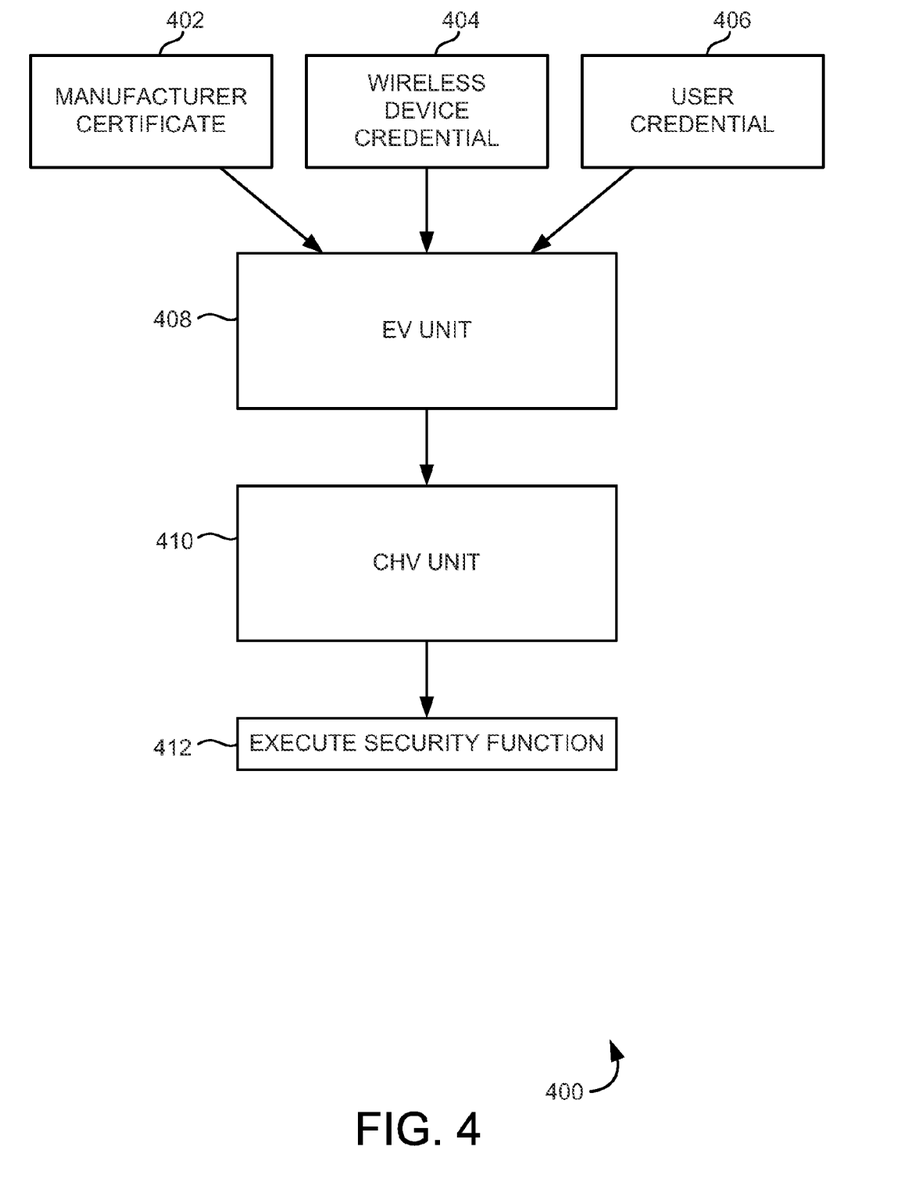
FIG. 4 illustrates an exemplary method of controlling a wireless communication module in communication with an electronic device.

FIG. 4 illustrates an exemplary method 400 of controlling a wireless communication module in communication with an electronic device, which can be performed in connection with the exemplary systems illustrated in FIGS. 1-3. A manufacturer certificate 402, a wireless device credential 404, and a user credential 406 are provided to EV unit 408. EV 408 unit generates an encryption value using the manufacturer certificate 402, the wireless device credential 404, and the user credential 406. EV unit 408 provides the encryption value to CHV unit 410, and CHV unit 410 generates an encryption hash value using the encryption value. CHV unit 410 outputs the cryptographic hash value, for example, to a processor such as processor 110, 208 or 310, to perform a security function, such as enabling a system to communicate wirelessly by enabling a communication port or a wireless communication device of said system.

Figure 5:
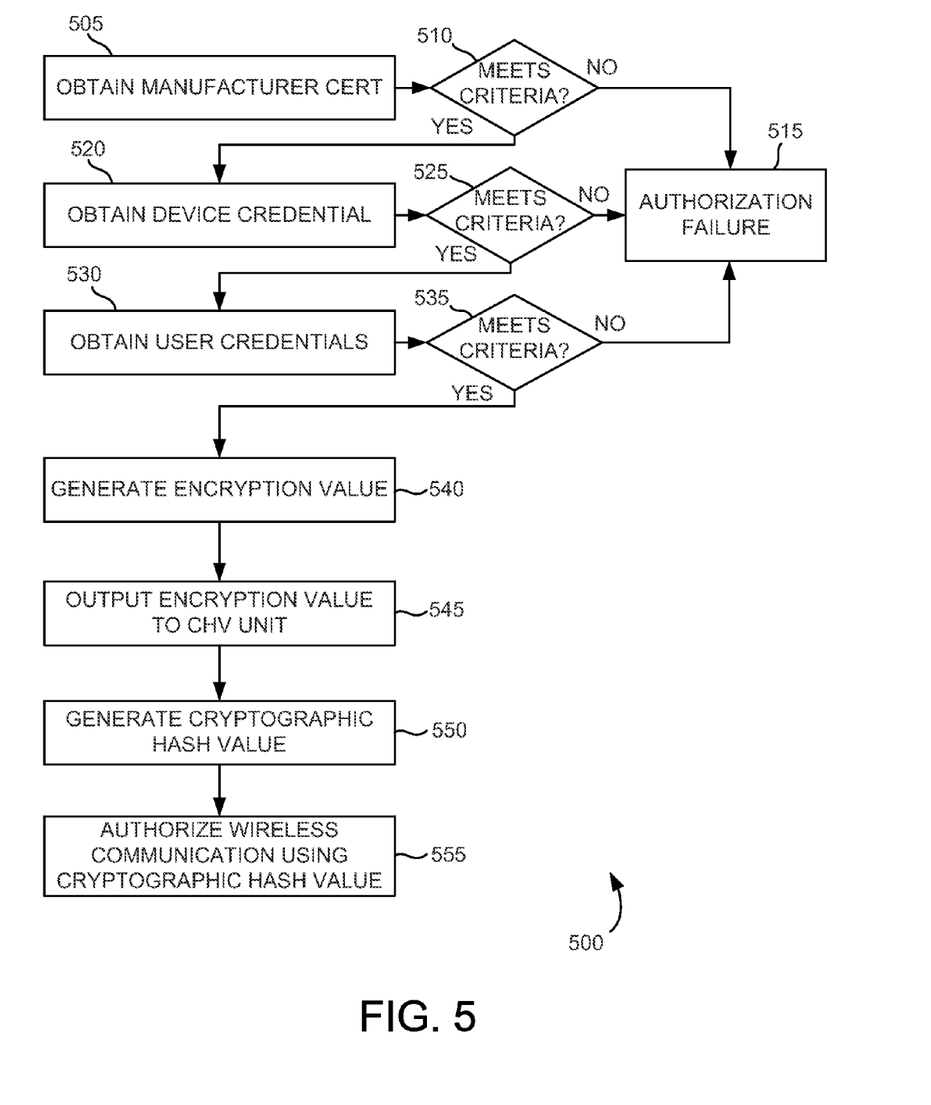
FIG. 5 illustrates another exemplary method of controlling a wireless communication module in communication with an electronic device.

FIG. 5 illustrates another exemplary method of controlling a wireless communication module in communication with an electronic device. In operation 505, a manufacturer certificate is obtained from a memory of an electronic device, such as from BIOS 106, 206 or 306. In operation 510, it is determined whether the manufacturer certificate meets a first validity criteria. When the certificate does not meet the first validity criteria (operation 510-NO), then authorization of the electronic device fails (operation 515). When an authorization failure of the manufacturer certificate occurs, a notification may be provided to a user.

When the manufacturer certificate meets the first validity criteria, in operation 520 a wireless device credential is obtained from the wireless communication module, such as wireless communication module 108, 210 or 308. In operation 525, it is determined whether the device credential meets a second validity criteria. When the device credential does not meet the second validity criteria (operation 525-NO), then authorization of the electronic device fails (operation 515). When an authorization failure of the wireless device credential occurs, a notification may be provided to a user.

When the device credential meets the second validity criteria, a user credential is obtained (operation 530). For example, a request for the user credential can be provided to a user at a display (such as display 104, 204 or 304), and the user credential can be received at an input device (such as input device 102, 202 or 302). In operation 535, it is determined whether the user credential meets a third validity criteria. When the user credential does not meet the third validity criteria (operation 535-NO), then authorization of the electronic device fails (operation 515). When an authorization failure of the user credential occurs, a notification may be provided to a user.

When the user credential meet the third validity criteria, an encryption value is generated using the manufacturer certificate, the wireless device credential and the user credential (operation 540). In operation 545, the generated encryption value is output to the CHV unit, and in operation 550 a cryptographic hash value is generated based on the encryption value. For example, the CHV unit may hash the encryption value to generate the cryptographic hash value. In operation 555, wireless communication by the wireless device is authorized using the cryptographic hash value.

Figure 6:
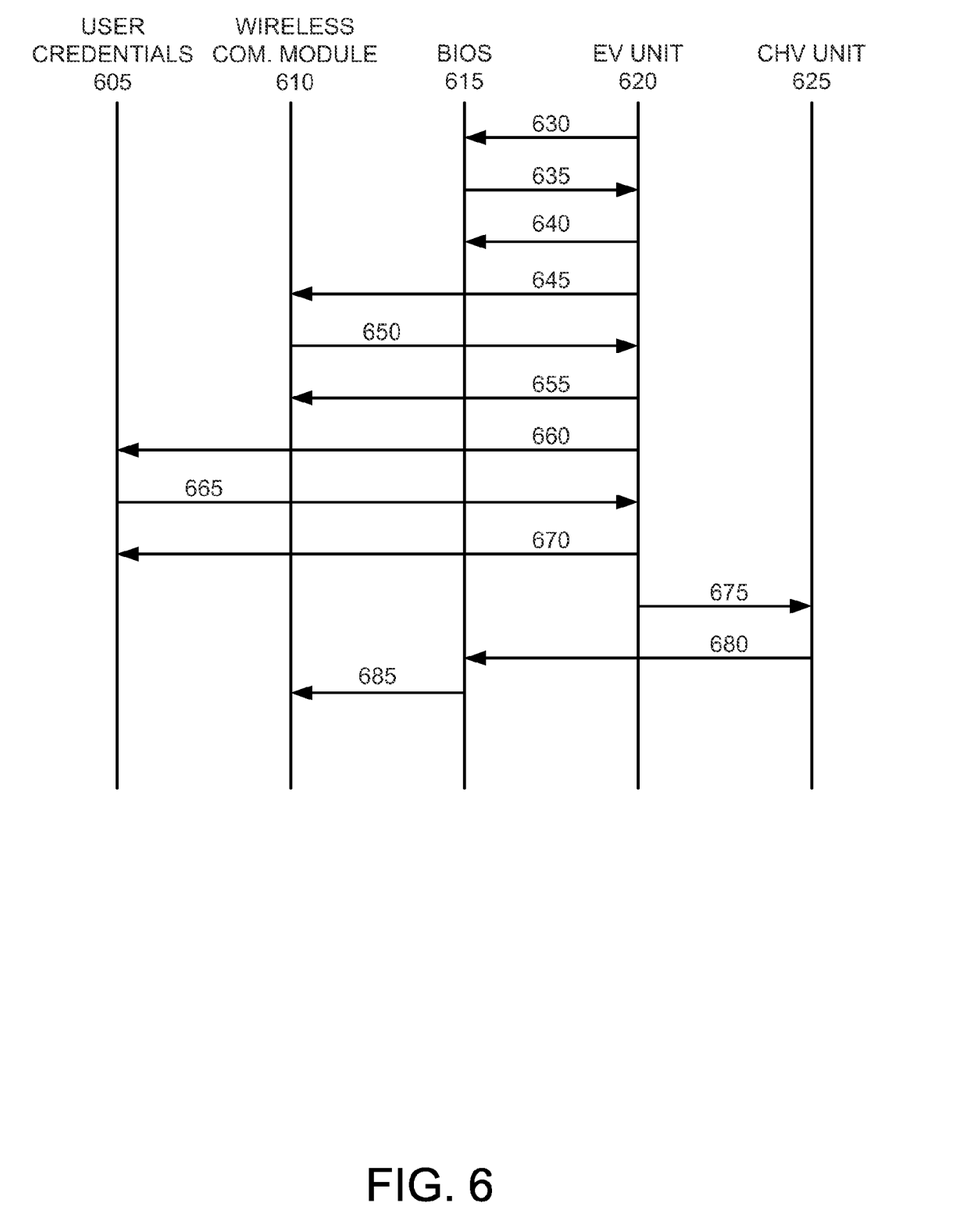
FIG. 6 is a signal flow diagram illustrating an exemplary method of controlling a wireless communication module in communication with an electronic device.

FIG. 6 is a signal flow diagram illustrating an exemplary method of controlling a wireless communication module in communication with an electronic device. EV unit 620 sends a request for a manufacturer certificate 630 to memory/BIOS 615, and memory/BIOS 615 responds to EV unit 620 with a manufacturer certificate 635. When the manufacturer certificate meets a first validity criteria, EV unit 620 sends an authorization reply 640 to memory/BIOS 615. Next, EV unit 620 sends a request for a wireless device credential 645 to the wireless communication module 610, and the wireless communication module 610 responds with the wireless device credential 650. When the wireless device credential meets a second validity criteria, EV unit 620 sends an authorization reply 655 to wireless communication module 610. Then, EV unit 620 sends a request for a user credential 660. The request for user credential 660 can be sent, for example, to a processor, such as processor 110, processor 208, or processor 310. The processor can instruct a display (such as display 104, 204, or 304) to display a request for the user credential, and the user credential can be received at an input device (such as input device 102, 202 or 302) and provided by the processor (in signal 665) to EV unit 620. If the user credential meets a third validity criteria, EV unit 620 sends an authorization reply 670.

EV unit 620 then generates an encryption value using the using the manufacturer certificate, the wireless device credential and the user credential, and provides the encryption value 675 to CHV unit 625. CHV unit 625 hashes the encryption value to generate a cryptographic hash value, and sends the cryptographic hash value 680 to memory/BIOS 615 for storage. The cryptographic hash value is also provided to wireless communication module 610 for use in communication with, for example, a wireless network or access point, to enable the electronic device to communicate wirelessly.

The operations illustrated in FIG. 6 need not be performed in the particular order illustrated. For example, the communication between EV unit 620 and wireless communication module 610 can be performed before the communication between EV unit 620 and memory/BIOS 615, or after the obtaining, of the user credentials (signals 660, 665 and 670). Similarly, the obtaining of the user credentials can be performed before the communication between EV unit 620 and either of memory/BIOS 615 and wireless communication module 610.

Figure 7:
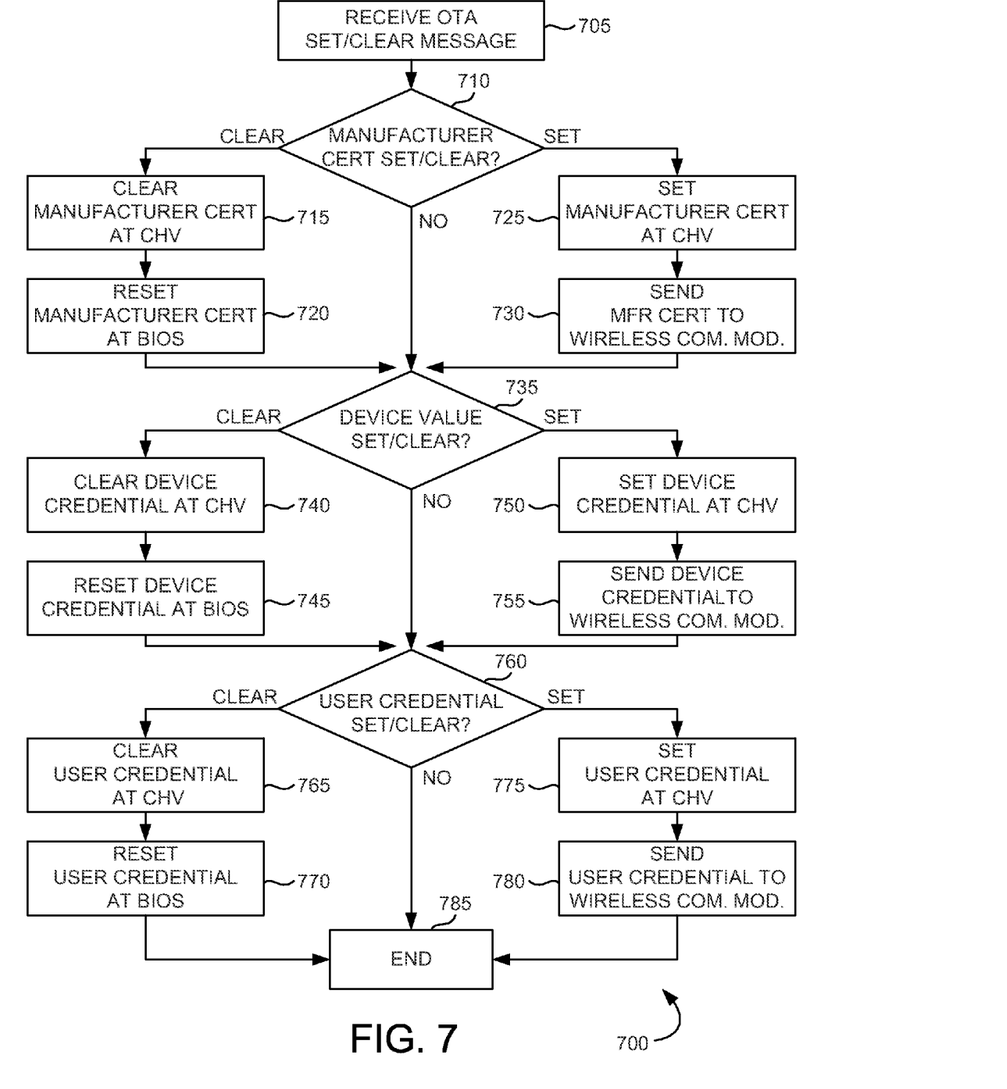
FIG. 7 illustrates an exemplary method of setting values by a wireless connection.

FIG. 7 illustrates an exemplary method of setting values by a wireless connection. For example, in order to maintain the security of a wireless device, or of a communication system with which a device communicates, a manufacturer certificate, a wireless device credential or a user credential can be changed periodically. As another example, stored information for the manufacturer certificate, wireless device credential or user credential can become corrupt and require resetting to permit proper function of the device. A command (such as a network command) can be received at the encryption key module, and at least one of at least one of the manufacturer certificate, the wireless device credential and the user credential can be changed according to the command.

In operation 705, a message is received by a wireless device, which can include one or more set messages or clear messages. When the message includes a manufacturer certificate clear message (operation 710-CLEAR), in operation 720 the manufacturer certificate is cleared in CHV unit (such as CHV unit 116, 218, or 320), and then the manufacturer certificate is reset at the device BIOS (such as memory/BIOS 106, 206, or 306). When the message 705 includes a manufacturer certificate set message operation 710-SET), the message 705 will include a new value for the manufacturer certificate, which is set at the CHV unit in operation 725. Then, in operation 730, the new manufacturer certificate is sent from the CHV to the wireless communication module (such as wireless communication module 108, 210, or 308). When the message 705 does not include a manufacturer certificate-related message, (operation 710-NO), the method proceeds to operation 735.

When the message includes a wireless device credential clear message (operation 735-CLEAR), in operation 740 the wireless device credential is cleared in the CHV unit, and then the wireless device credential is reset at the memory/BIOS (operation 745). When the message 705 includes a wireless device credential set message (operation 735-SET), the message 705 will include a new value for the wireless device credential, which is set at the CHV unit in operation 750. Then, in operation 755, the new wireless device credential is sent from the CHV to the wireless communication module. When the message 705 does not include a message related to the wireless device credential (operation 735-NO), the method proceeds to operation 760.

When the message includes a user credential clear message (operation 760-CLEAR), in operation 765 the user credential is cleared in the CHV unit, and then the user credential is reset at the BIOS (operation 770). When the message 705 includes a user credential set message (operation 760-SET), the message 705 will include a new value for the user credential, which is set at the CHV unit in operation 775. Then, in operation 780, the new user credential is sent from the CHV to the wireless communication module. When the message 705 does not include a user credential-related message (operation 760-NO), the method proceeds to operation 785 and ends.

Figure 8:
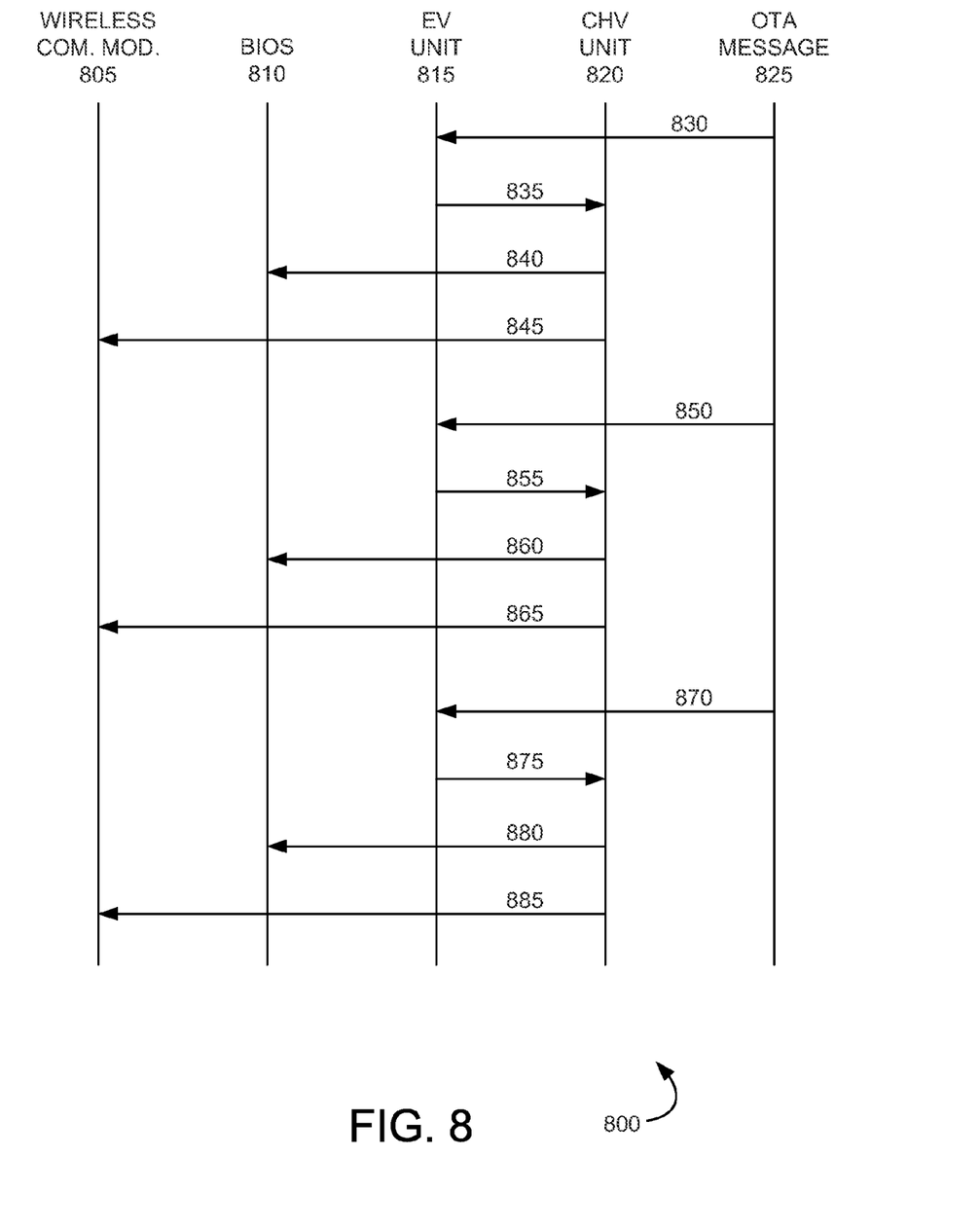
FIG. 8 is a signal flow diagram illustrating a method of setting values by a wireless connection.

FIG. 8 is a signal flow diagram illustrating a method of setting values by a wireless connection. A message 825 is received by a wireless device which can include one or more set or clear messages. When message 825 includes a manufacturer certificate clear message or set message 830, the clear message or set message 830 is sent to EV unit 815 (such as EV unit 114, 216 or 318) and then passed to CHV unit 820 (such as CHV unit 116, 218, or 320) in message 835. Based on whether message 835 is a set message or a clear message, the manufacturer certificate is set, or cleared and reset, at CHV unit 820. The new value for the manufacturer certificate is sent to BIOS 810 in message 840, and, in addition, the manufacturer certificate value 845 is sent from CHV unit 820 to wireless communication module 805.

When message 825 includes a wireless device credential clear message or set message 850, the clear message or set message is sent to EV unit 815 and is then passed to CHV unit 820 in message 855. Depending on whether message 855 is a set message or a clear message, the wireless device credential is set, or cleared and reset, at CHV unit 820. The new value for the wireless device credential is sent to BIOS 810 in message 840, and, in addition, the wireless device credential value 845 is also sent from CHV unit 820 to wireless communication module 805.

When message 825 includes a user credential clear message or set message 870, the clear message or set message is sent to EV unit 815, and the message is then passed to the CHV unit 820 in message 875. Based on whether the message 875 is a set message or a clear message, the user credential is set, or cleared and reset, based on message 840 at CHV unit 820. The new value for the user credential is sent to BIOS 810 in message 880, and, in addition, the user credential value 885 is also sent from CHV unit 820 to wireless communication module 805.

The received message 825 can comprise one or more of the messages described above, including the manufacturer certificate clear message or set message 830, the wireless device credential clear message or set message 850, and the user credential clear message or set message 870.

Figure 9:
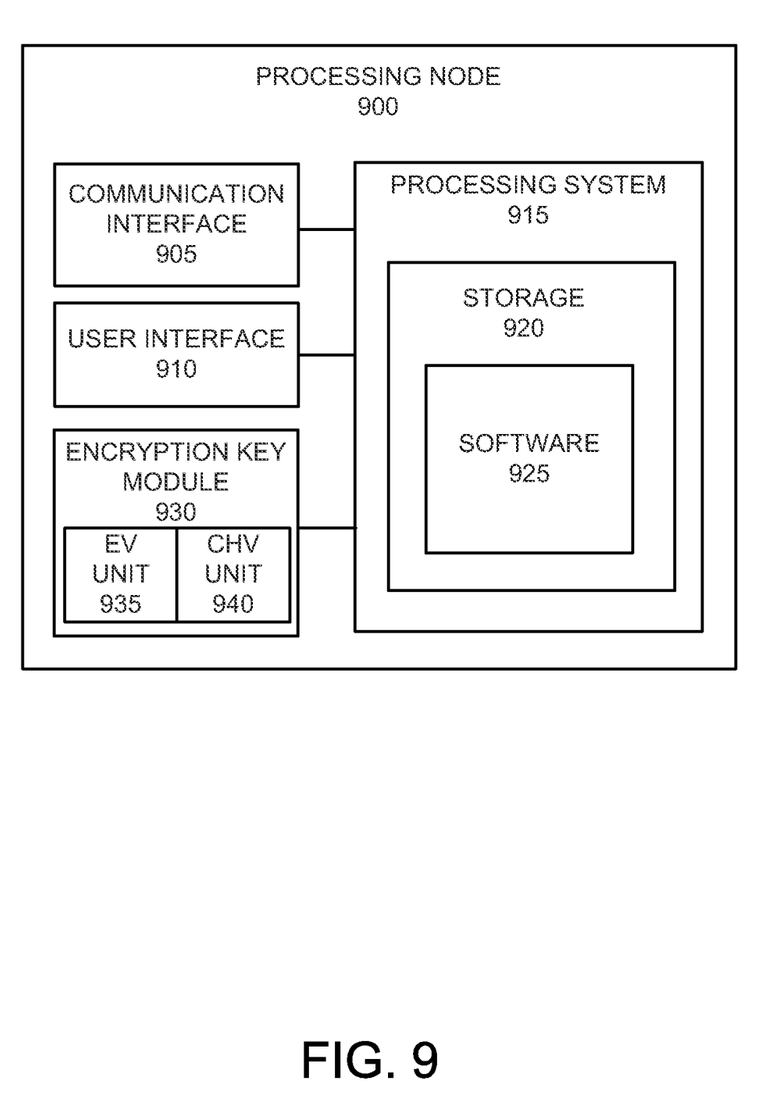
FIG. 9 illustrates an exemplary processing node.

FIG. 9 illustrates an exemplary processing node 900. Processing node 900 is an example of processing node 314 illustrated in FIG. 3, and can be a network element in a communication network. Processing node 900 comprises communication interface 905, user interface 910, encryption key module 935, and processing system 915. Communication interface 905 enables the processing node to communicate with one or more elements of a communication system, such as with elements of communication network 312. Processing system 603, which is linked to communication interface 905, user interface 910, and encryption key module 930, includes processing circuitry for executing software 925 and storage 920 to store software 925. Processing node 900 may further include additional components such as a power management unit, a control interface unit, etc., that are not illustrated for brevity.

Processing system 915 may include storage 920 comprising a disk drive, flash drive, memory circuitry, or some other memory device. Storage 920 can store software 925 which is used in the operation of the processing node 900. Software 925 may include an operating system, utilities, drivers, network interfaces, applications, or some other type of software. Processing system 915 includes a microprocessor and other circuitry to retrieve and execute software 925 from storage 920. Processing system 915 is typically mounted on a circuit board that may also include storage 920 and/or portions of communication interface 905. User interface 910 permits a user to configure and control the operation of the processing node 900.

Encryption key module 930 can be a component integral to the processing node 900, for example an internal chip or a circuit board component or other hardware component, or can also be embodied in computer-executable code on a computer-readable medium. Other examples are also possible. Encryption key module 930 EV unit 935 and CHV unit 940. EV unit 114 can receive a manufacturer certificate from the a device BIOS, a wireless device credential from a device wireless communication module, and a user credential from a input device, and can generate an encryption value using the manufacturer certificate, wireless device credential, and user credential. EV 935 unit can provide the encryption value to CHV unit 116. Using the encryption value, the CHV unit 940 can create a cryptographic hash value, which comprises for example an encryption key. CHV unit 940 can provide the cryptographic hash value to a device processor, which can execute a security function such as validating the cryptographic hash value, to enable network communication by a device.

Some or all of the actions performed by the exemplary embodiments described herein can be performed under the control of a computer system executing computer-readable codes embedded on a computer-readable recording medium or on communication signals transmitted through a transitory medium. The computer-readable recording medium may include any data storage device that can store data which can thereafter be read by a computer system. Examples of the computer-readable recording medium include, but are not limited to, read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. The communication signals transmitted through a transitory medium may include, for example, signals which modulate carrier waves transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of controlling a wireless communication module in communication with an electronic device, the method comprising:

obtaining, at a processor of the electronic device, a manufacturer certificate that comprises a unique device identifier of the electronic device from a memory of the electronic device;

obtaining, at the processor of the electronic device, a wireless device credential that comprises a unique identifier of the wireless communication module from a memory of the wireless communication module;

obtaining, at the processor of the electronic device, a user credential from a user input at the electronic device;

determining, at the processor of the electronic device, that the manufacturer certificate meets a first validity criteria, the wireless device credential meets a second validity criteria, and the user device credential meets a third validity criteria, wherein when at least one of the manufacturer certificate, the wireless device credential, and the user credential is determined to be invalid:

the wireless communication module and an external communication port of the electronic device are disabled;

and, a network command is received at a cryptographic hash unit of an encryption key module to clear and reset at least one of the invalid manufacturer certificate, the invalid wireless device credential, and the invalid user credential to obtain the valid manufacturer certificate, the valid wireless device credential, and the valid user device credential, wherein:

the cryptographic hash unit is configured to clear the invalid manufacturer certificate at the cryptographic hash unit when a manufacturer certificate clear message is received at the cryptographic hash unit from the processor of the electronic device and configured to reset and include a new value for the manufacturer certificate at a basic input/output operating system (BIOS) of the memory of the wireless communication module when a manufacturer set message is received at the cryptographic hash unit;

the cryptographic hash unit is configured to clear the invalid wireless device credential at the cryptographic hash unit when a wireless device credential clear message is received from the processor of the electronic device at the cryptographic hash unit and configured to reset and include a new value for the wireless device credential at the BIOS when a wireless device credential set message is received at the cryptographic hash unit; and the cryptographic hash unit is configured to clear the invalid user credential at the cryptographic hash unit when a user credential clear message is received at the cryptographic hash unit from the processor of the electronic device and configured to reset and include a new value for the user credential at the BIOS when a user credential set message is received at the cryptographic hash unit;

and, generating, at an encryption value unit of the encryption key module, an encryption value using the valid manufacturer certificate, the valid wireless device credential, and the valid user credential;

hashing, at a cryptographic hash unit of the encryption key module, the encryption value and generating a cryptographic hash value based on the hashed encryption value;

storing, at the BIOS of the memory of the wireless communication module, the cryptographic hash value and providing the cryptographic hash value to the wireless communication module to enable the electronic device to communicate wirelessly.

2. The method of claim 1, wherein the encryption key module is within the electronic device.

3. The method of claim 1, wherein the encryption key module is external to the electronic device and in communication with the electronic device.

4. The method of claim 1, wherein the encryption key module is within the wireless communication module.

5. A system for controlling a wireless communication module in communication with an electronic device, the system comprising:

a processor configured to:
obtain a manufacturer certificate that comprises a unique device identifier of the electronic device from a memory of the electronic device, a wireless device credential that comprises a unique identifier of the wireless communication module from a memory of the wireless communication module, and a user credential from a user input at the electronic device;

determine that the manufacturer certificate meets a first validity criteria, the wireless device credential meets a second validity criteria, and the user credential meets a third validity criteria, wherein when the manufacturer certificate, the wireless device credential, and the user credential is determined to the invalid, instruct the disabling of the wireless communication module and an external communication port of the electronic device;

and receive, at a cryptographic hash unit of an encryption key module, a network command to clear and reset at least one of the invalid manufacturer certificate, the invalid wireless device credential, and the invalid user credential to obtain the valid manufacturer certificate, the valid wireless device credential, and the valid user credential, wherein:

the cryptographic hash unit is configured to clear the invalid manufacturer certificate at the cryptographic hash unit when a manufacturer certificate clear message is received at the cryptographic hash unit from the processor of the electronic device and configured to reset and include a new value for the manufacturer certificate at a basic input/output operating system (BIOS) of the memory of the wireless communication module when a manufacturer set message is received at the cryptographic hash unit;

the cryptographic hash unit is configured to clear the invalid wireless device credential at the cryptographic hash unit when a wireless device credential clear message is received from the processor of the electronic device at the cryptographic hash unit and configured to reset and include a new value for the wireless device credential at the BIOS when a wireless device credential set message is received at the cryptographic hash unit;

and the cryptographic hash unit is configured to clear the invalid user credential at the cryptographic hash unit when a user credential clear message is received at the cryptographic hash unit from the processor of the electronic device and configured to reset and include a new value for the user credential at the BIOS when a user credential set message is received at the cryptographic hash unit;

and, an encryption key module in communication with the electronic device configured to:

generate, at an encryption value unit, an encryption value using the valid manufacturer certificate, the valid wireless device credential, and the valid user credential;

hash, at a cryptographic hash unit, the encryption value to generate a cryptographic hash value based on the hashed encryption value;

store, at the BIOS of the memory of the wireless communication module, the cryptographic hash value and provide the cryptographic hash value to the wireless communication module to enable the electronic device to communicate wirelessly.

6. The system of claim 5, wherein the encryption key module is within the electronic device.

7. The system of claim 5, wherein the encryption key module is external to the electronic device and in communication with the electronic device.

8. The system of claim 5, wherein the encryption key module is within the wireless communication module.

* * * * *